United States Patent
Sakai et al.

(10) Patent No.: US 7,664,526 B2
(45) Date of Patent: Feb. 16, 2010

(54) METHOD OF ESTABLISHING COMMUNICATION LINK, AND COMPUTER PRODUCT

(75) Inventors: Yuki Sakai, Kawasaki (JP); Seiichi Nishijima, Kawasaki (JP); Naoki Oodate, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 11/443,150

(22) Filed: May 31, 2006

(65) Prior Publication Data

US 2007/0190947 A1  Aug. 16, 2007

(30) Foreign Application Priority Data

Feb. 15, 2006 (JP) .............................. 2006-038585

(51) Int. Cl.
*H04B 1/38* (2006.01)
*H04M 1/00* (2006.01)

(52) U.S. Cl. .................... 455/552.1; 455/502; 455/464; 455/458

(58) Field of Classification Search ................. 455/464, 455/434, 574, 343.1, 426.1, 502, 509, 452.1, 455/412.2, 458, 435.1, 552.1, 550.1, 41.2, 455/67.14, 555, 62, 463; 370/335, 337

See application file for complete search history.

(56) References Cited

U.S. PATENT DOCUMENTS

| 5,911,120 A  * | 6/1999 | Jarett et al. ................. 455/417 |
| 6,571,103 B1 * | 5/2003 | Novakov .................... 455/464 |
| 2003/0147370 A1* | 8/2003 | Wu ............................ 370/338 |

FOREIGN PATENT DOCUMENTS

| JP | 2000-209644 A | 7/2000 |
| JP | 2004-153800 A | 5/2004 |

* cited by examiner

*Primary Examiner*—John Lee
(74) *Attorney, Agent, or Firm*—Arent Fox LLP

(57) ABSTRACT

A radio device from which communication is started transmits a confirmation signal to a counterpart, and if an acknowledgement signal is not returned from the counterpart, switches a communication mode to another communication mode. This operation is repeated until the acknowledgement signal is returned from the counterpart. Thus, the communication mode is matched with that of the counterpart, thereby establishing a communication link with the counterpart. A radio device caused to start communication by a second radio device receives a signal from the second radio device. The radio device switches a communication mode to another communication mode if synchronization is failed to be established. This operation is repeated until the synchronization is succeeded to be established. Thus, the communication mode is matched with that of the second radio device to be a communication counterpart, thereby establishing a link with the second radio device.

6 Claims, 12 Drawing Sheets

FIG.7

| TRANSMITTER RADIO DEVICE (MODE VARIABLE) | | | | RECEIVER RADIO DEVICE (MODE FIXED) |
|---|---|---|---|---|
| 1 | B | B | ---------- | A |
| 2 | B | B | ---------- | A |
| 3 | B | B | ---------- | A |
| 4 | C | (A) | ---------- | A |
| 5 | C | A | ---------- | A |
| 6 | C | A | ---------- | A |
| 7 | D | E | ---------- | A |
| 8 | D | E | ---------- | A |
| 9 | D | E | ---------- | A |
| 10 | E | D | ---------- | A |
| 11 | E | D | ---------- | A |
| 12 | E | D | ---------- | A |
| 13 | (A) | C | ---------- | A |
| 14 | A | C | ---------- | A |
| 15 | A | C | ---------- | A |

100 (transmitter), 200 (receiver)

FIG.11

METHOD OF ESTABLISHING COMMUNICATION LINK, AND COMPUTER PRODUCT

CROSS-REFERENCE TO RELATED APPLICATIONS

This application is based upon and claims the benefit of priority from the prior Japanese Patent Application No. 2006-038585, filed on Feb. 15, 2006, the entire contents of which are incorporated herein by reference.

BACKGROUND OF THE INVENTION

1. Field of the Invention

The present invention relates to a technology for establishing communication links in software defined radios (SDRs).

2. Description of the Related Art

Conventionally, radio devices capable of supporting plural communication modes have been proposed. For example, such a radio device is known that includes a transmitting unit and a receiving unit capable of communicating with plural wireless communication networks applying different communication modes, in respective communication modes, a controlling unit that is connected, via the transmitting unit and the receiving unit, to a communication line of a wireless communication network selected from the wireless communication networks, and a traffic information recognizing unit that recognizes traffic information of the communication line based on a reception signal received by the receiving unit. In the radio device, upon connection to a communication line, the control unit selects a wireless communication network having a communication line with a less activity ratio indicated by the traffic information obtained by the traffic information recognizing unit from among the wireless communication networks (for example, Japanese Patent Application Laid-open Publication No. 2000-209644).

Moreover, in recent years, development of an SDR that supports plural communication modes has been active. For example, such an SDR is known that includes a radio unit that receives a radio signal for conversion to a baseband signal, a baseband signal processing unit for processing the baseband signal that can be restructured, and a restructuring unit that restructures the baseband signal processing unit. In the SDR, the restructuring unit restructures only a part of the baseband signal processing unit performing different arithmetic processes between wireless communication modes (for example, Japanese Patent Application Laid-open Publication No. 2004-153800).

In the radio device supporting plural communication modes, it is necessary to match a communication mode thereof to that of a communication counterpart prior to starting communication with the counterpart. Therefore, in the conventional radio devices, prior to starting proper data transmission or reception, it is necessary to communicate, via a dedicated radio channel, with the counterpart to acquire the communication mode of the counterpart to match the communication mode to that of the counterpart. Thus, a link with the communication counterpart is established. Therefore, besides an originally required radio processing circuit for plural communication modes, another radio processing circuit is required for establishing a communication link. As a result, the radio device has a redundant configuration.

SUMMARY OF THE INVENTION

It is an object of the present invention to at least solve the above problems in the conventional technologies.

A method according to one aspect of the present invention is of establishing a communication link in a radio device supporting a plurality of communication modes. The method includes transmitting a confirmation signal to a communication counterpart with which the communication link is to be established; and switching a communication mode to another communication mode if an acknowledgment signal is not returned from the communication counterpart in response to the confirmation signal.

A method according to another aspect of the present invention is of establishing a communication link in a radio device supporting a plurality of communication modes. The method includes detecting a reception signal at a predetermined level during reception standby; trying to establish synchronization based on the reception signal; and switching a communication mode to another communication mode if the synchronization is failed to be established at the trying.

A computer-readable recording medium according to still another aspect of the present invention stores therein a computer program for realizing a method according to the above aspects.

According to the present invention, the software defined radios (SDRs) can establish communication links without any additional radio processing circuits for communication link establishment.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a schematic for explaining a count for the transmitter radio device to estimate the communication mode of the receiver radio device when the receiver communication mode is fixed;

FIG. 11 is a schematic for explaining the count for the transmitter radio device and the receiver radio device to estimate the communication modes of each other.

DETAILED DESCRIPTION OF THE PREFERRED EMBODIMENTS

Exemplary embodiments of the present invention will be explained in detail with reference to the accompanying drawings.

Figure 1:
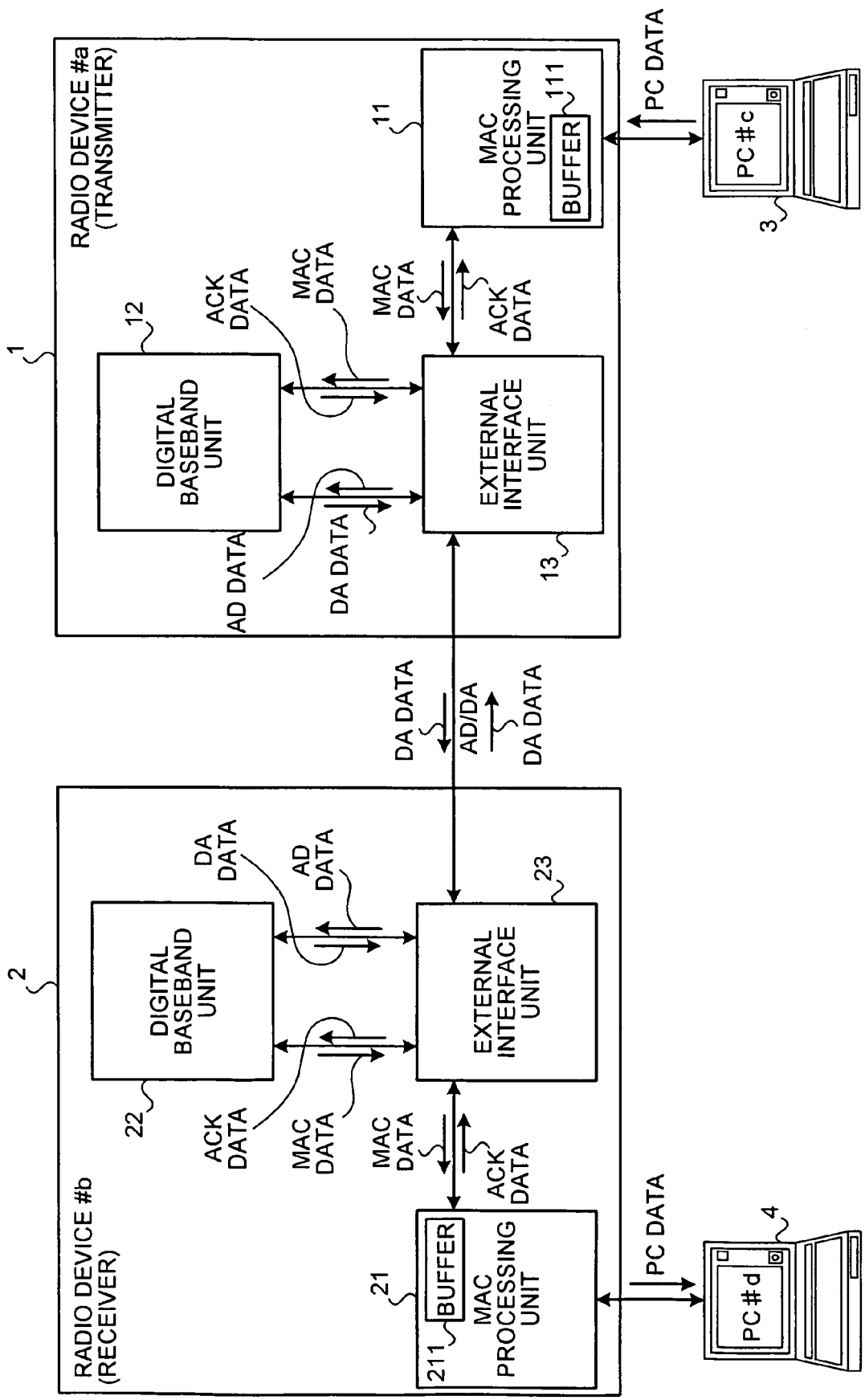
FIG. 1 is a schematic for illustrating a configuration of a radio device according to an embodiment of the present invention and data flows in radio devices.

FIG. 1 illustrates a configuration of a radio device according to an embodiment of the present invention and data flows in the radio device. In FIG. 1, reference numerals 1 and 2 denote radio devices. The radio devices 1 and 2 serve respectively as the transmitter side device and the receiver side device, and vice versa. For the convenience of description, one is denoted as a radio device #a 1 and the other is denoted as #b 2. The radio device #a 1 includes a MAC processing unit 11, a digital baseband unit 12, and an external interface unit 13. The radio device #b 2 includes a MAC processing unit 21, a digital baseband unit 22, and an external interface unit 23.

The MAC processing units 11 and 21 on the transmitter side divide PC data to be transmitted such as text data, audio data, image data, etc., into packets for conversion to MAC data (MAC layer data) suited for wireless communications. On the contrary, the MAC processing units 11 and 21 on the receiver side restructure the divided packets into data for conversion of the MAC data to original PC data such as text data, audio data, image data, etc. The MAC processing units 11 and 21 include buffers 111 and 211, respectively, accumulating MAC data or ACK data.

The digital baseband units 12 and 22 on the transmitter side perform modulation processing as baseband processing for the MAC data, whereas the digital baseband units 12 and 22 on the receiver side perform demodulation processing as baseband processing for the MAC data. The external interface units 13 and 23 are interfaces allowing the digital baseband units 12 and 22 to send data to or receive data from the radio device of the communication counterpart.

Although not particularly limited, the radio device #a 1 and the radio device #b 2 are devices for implementing a wireless local-area-network function, connected to or built in personal computers 3 and 4, respectively. The MAC processing unit 11 of the radio device #a 1 is connected to the personal computer (hereinafter, "PC #c") 3. The MAC processing unit 21 of the radio device #b 2 is connected to the personal computer (hereinafter, "PC #d") 4.

Data flow will be described on the assumption that the radio device #a 1 acts as the transmitter with the radio device #b 2 as the receiver. To perform data transmission/reception between the radio device #a 1 and the radio device #b 2, link needs to be established between the radio device #a 1 and the radio device #b 2. For example, the radio device #a 1 to start wireless communication transmits a link confirmation signal to the radio device #b 2 to be the communication counterpart. The radio device #b 2 receives the link conformation signal, and, when link with the radio device #a 1 is established, returns ACK data to the radio device #a 1.

The ACK data is output from the MAC processing unit 21 of the radio device #b 2, and sent via the external interface 23 to the digital baseband unit 22 for modulation therein. The modulated DA data is transmitted from the external interface unit 23 via an antenna (not shown) to the radio device #a 1.

Via an antenna (not shown), the radio device #a 1 receives the DA data transmitted from the radio device #b 2 at the external interface unit 13. The received data is sent to the digital baseband unit 12 for demodulation to ACK data therein. The ACK data is sent via the external interface unit 13 to the MAC processing unit 11 for accumulation into the buffer 111. The radio device #a 1 analyzes the accumulated ACK data, and determines whether link with the radio device #b 2 can be established.

In the transmitter radio device #a 1 after establishment of link between the radio device #a 1 and the radio device #b 2, PC data input from the PC #c 3 are converted into MAC data by the MAC processing unit 11. The MAC data is sent via the external interface unit 13 to the digital baseband unit 12 for modulation therein. The modulated DA data is transmitted from the external interface unit 13 via the antenna not shown to the radio device #b 2.

Via the antenna (not shown), the receiver radio device #b 2 receives the DA data transmitted from the radio device #a 1 at the external interface unit 23. The received data is sent to the digital baseband unit 22 for demodulation to MAC data therein. The MAC data is sent via the external interface unit 23 to the MAC processing unit 21 for accumulation into the buffer 211. The radio device #b 2 analyzes the accumulated MAC data, and determines whether all packets are received without errors. If all the packets are received normally, then the accumulated MAC data is converted into the original PC data. The PC data is output to the PC #d 4.

Figure 2:
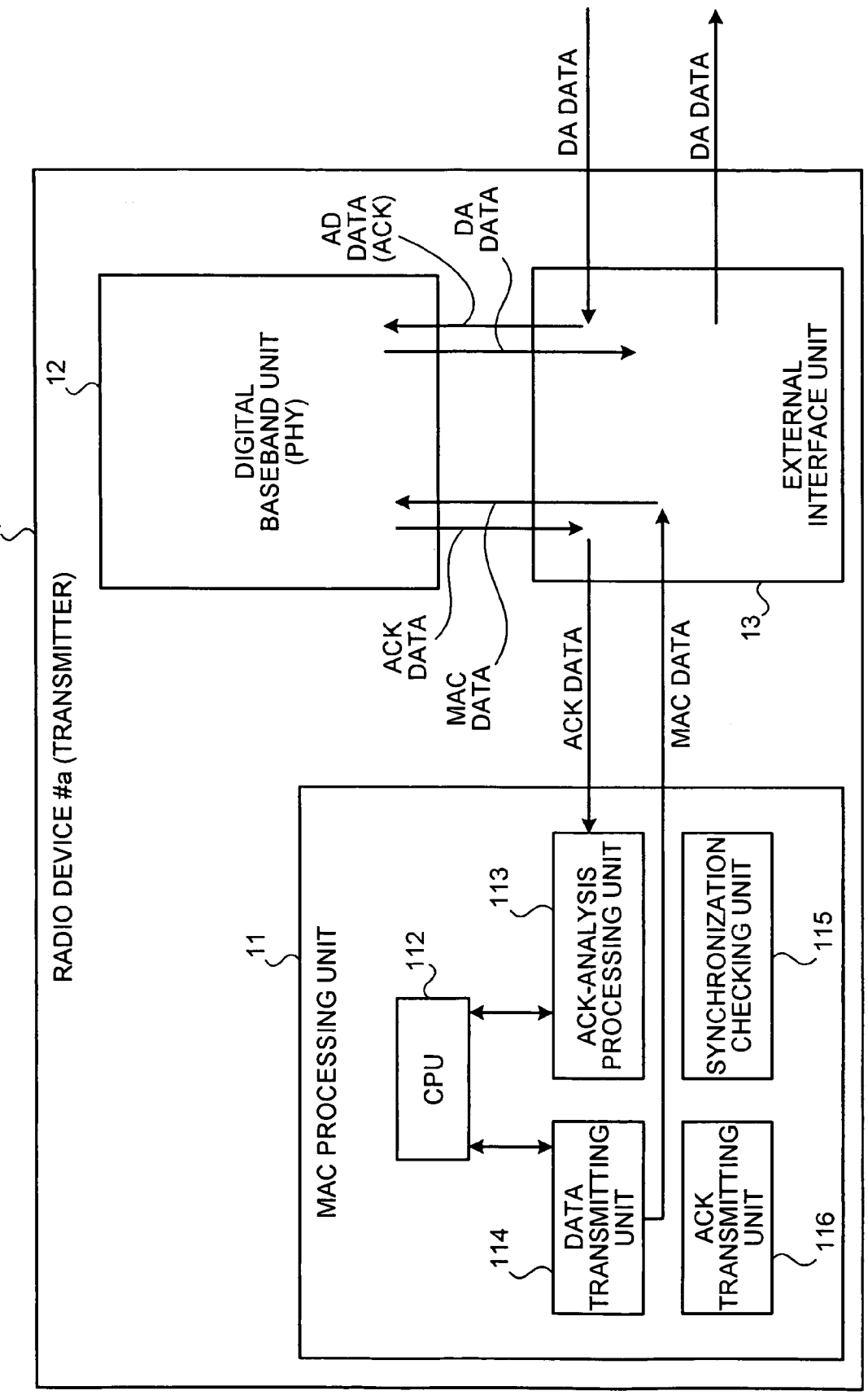
FIG. 2 is a schematic for illustrating a configuration of a media-access-control (MAC) processing unit of a transmitter radio device and data flows in the transmitter radio device.

FIG. 2 illustrates a configuration of the MAC processing unit of the transmitter radio device and data flows in the transmitter radio device. As shown in FIG. 2, the MAC processing unit 11 of the radio device #a 1 includes a central processing unit (CPU) 112, an ACK-analysis processing unit 113, a data transmitting unit 114, a synchronization checking unit 115, and an ACK-transmitting unit 116. The CPU 112 provides controls the MAC processing unit 11. The ACK-analysis processing unit 113 performs analysis of the above ACK data. The data transmitting unit 114 converts PC data to be transmitted into MAC data for delivery to the external interface unit 13.

Figure 3:
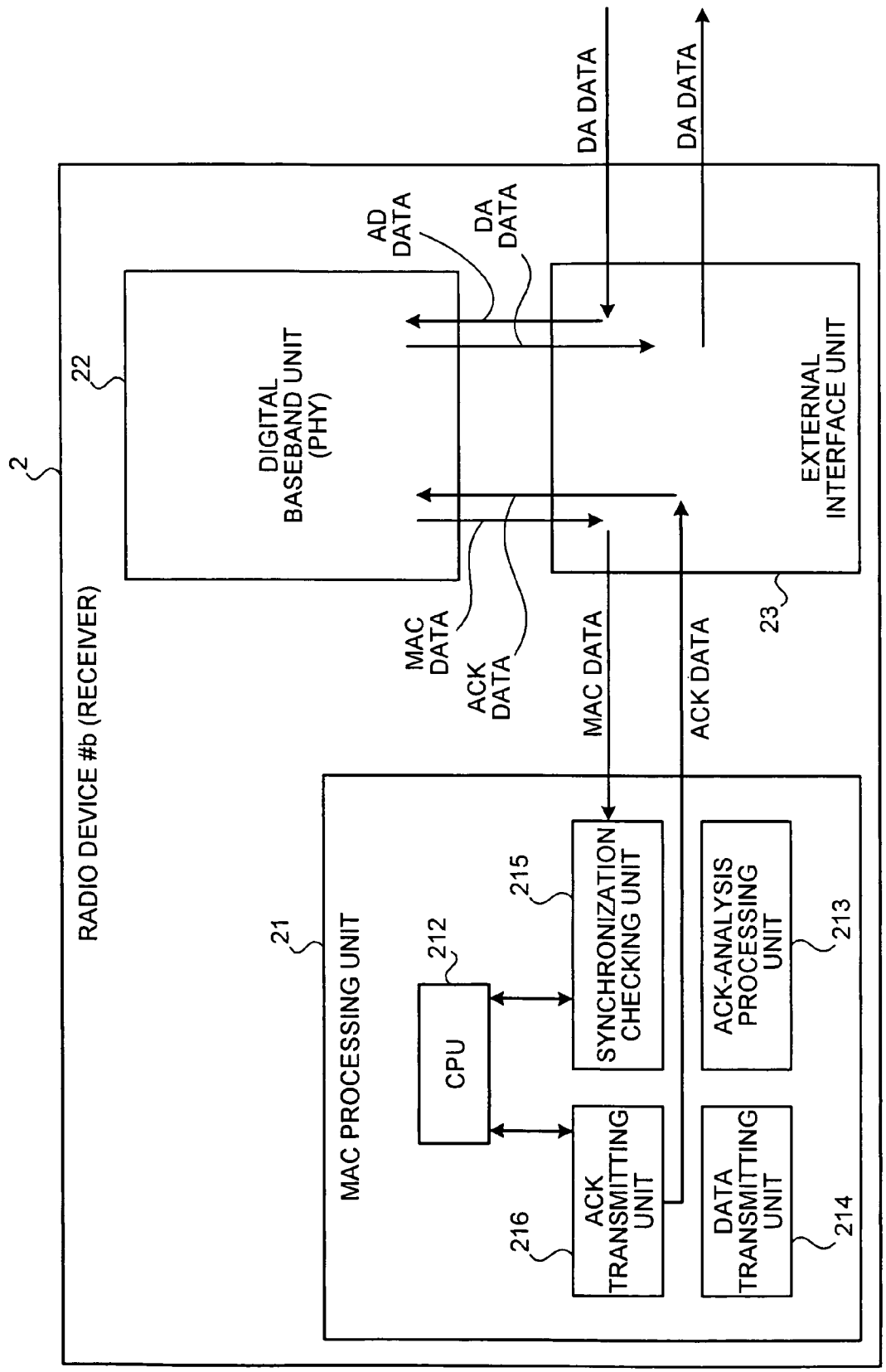
FIG. 3 is a schematic for illustrating a configuration of a media-access-control (MAC) processing unit of a receiver radio device and data flows in the transmitter radio device.

FIG. 3 illustrates a configuration of the MAC processing unit of the receiver radio device and data flows in the receiver radio device. As shown in FIG. 3, the MAC processing unit 21 of the radio device #b 2 includes a CPU 212, an ACK-analysis processing unit 213, a data transmitting unit 214, a synchronization checking unit 215, and an ACK transmitting unit 216. The CPU 212 provides control of the entirety of the MAC processing unit 21. The synchronization checking unit 215 determines whether synchronization is established based on information on presence or absence of synchronization establishment fed from the digital baseband unit 22 when the MAC processing unit 21 has detected data reception as a result of detecting a CCA (receive signal strength indicator (RSSI)). The ACK transmitting unit 216 transmits ACK data if synchronization is established.

When the radio device #b 2 serves as a transmitter with the radio device #a 1 serving as a receiver, the ACK-analysis processing unit 213 and data transmitting unit 214 of the radio device #b 2 operate similarly to the ACK-analysis processing unit 113 and data transmitting unit 114 of the radio device #a 1. The synchronization checking unit 115 and the ACK transmitting unit 116 of the radio device #a 1 operate similarly to the synchronization checking unit 215 and the ACK transmitting unit 216 of the radio device #b 2.

A procedure will first be described of the case where the transmitter radio device #a 1 estimates the communication mode of the receiver radio device #b 2, the transmitter radio device #a 1 being a software defined radio supporting a plurality of communication modes. In this case, the digital baseband unit 12 of the radio device #a 1 includes a reconfigurable circuit in which wiring patterns, etc., can be reconfigured so as to match the communication mode. The MAC processing unit 11 and the external interface unit 13 are configured in a form of a field programmable gate array (FPGA).

Figure 4:
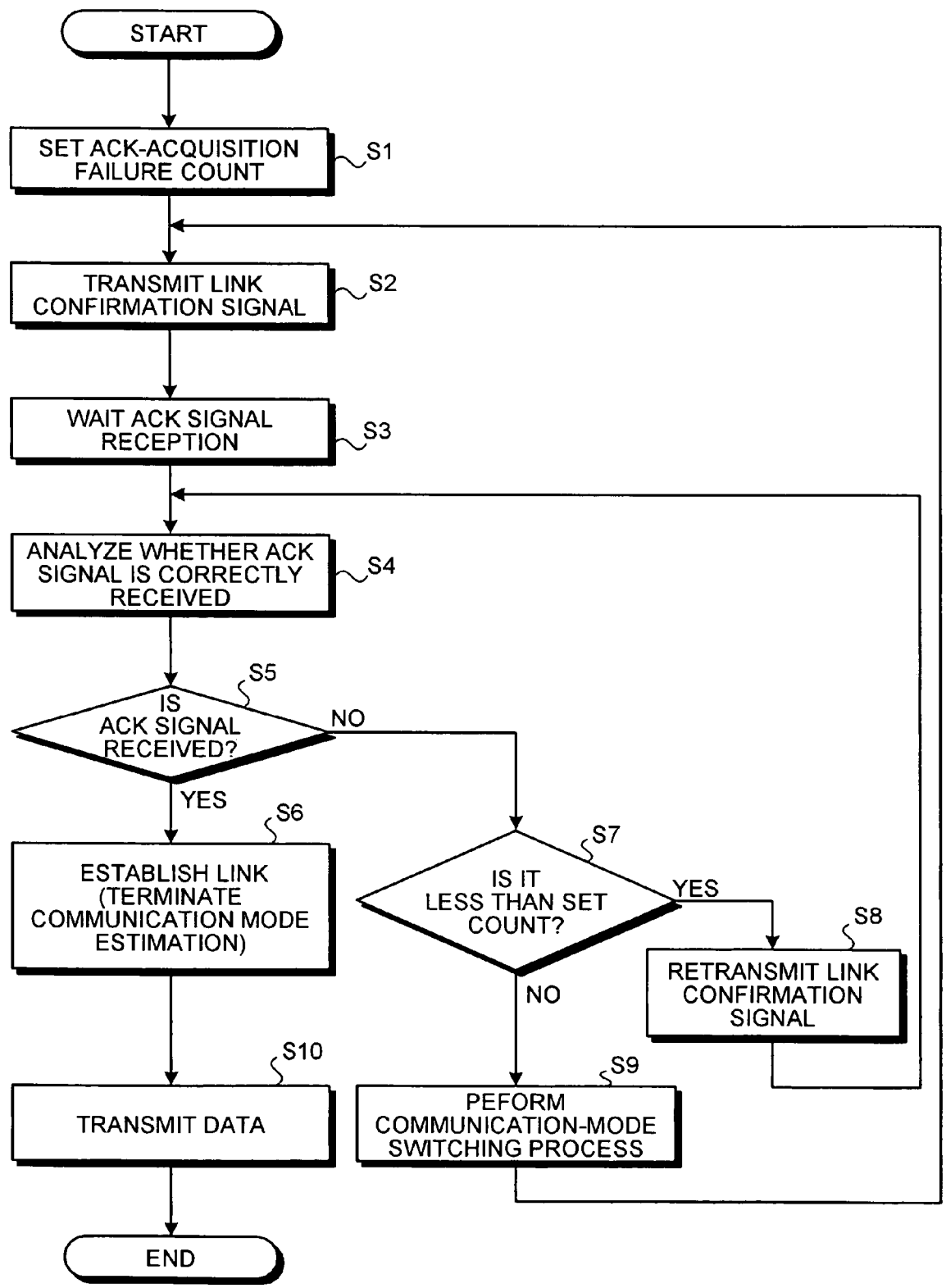
FIG. 4 is a flowchart of a communication-mode estimating process by the transmitter radio device.

FIG. 4 is a flowchart of a communication-mode estimating process by the transmitter radio device. As shown in FIG. 4, a threshold for switching the communication mode is set in advance. The threshold is the count of failures in ACK acquisition (step S1). The threshold may be set by the user operating the PC #c 3 so as to allow the radio device #a 1 to store a communication link establishing program recorded on hard disk of the PC #c 3, a flexible disk connected to the PC #c 3, or a computer-readable recording medium, such as ac compact-disk read-only memory (CD-ROM), a magneto optical (MO) disk, and a digital versatile disk (DVD), or to store a communication link establishing program downloaded through a network such as the Internet.

The communication link establishing program is stored in memory (not shown in FIGS. 1 and 2) within the CPU 112 of the MAC processing unit 11. Only the ACK acquisition failure count may be set separately from the communication link establishing program. To retain the communication link establishing program or the set threshold even when the power of the radio device #a 1 is turned off, the program or the set value may be stored in rewritable nonvolatile memory such as flash memory that is electrically erasable.

The CPU 112 executes the communication link establishing program. This allows the radio device #a 1 to transmit a link conformation signal to a communication counterpart (step S2). The radio device #a 1 waits return of an ACK signal from the communication counterpart (step S3). The radio device #a 1 then analyzes whether the ACK signal is correctly received (step S4). As a result, if the ACK signal is received (step S5: YES), the radio device #a 1 succeeds in link establishment, ending the communication-mode estimating process (step S6), to start data transmission (step S10). Thus, a series of processes terminate.

On the other hand, if the ACK signal is not received (step S5: NO), the radio device #a 1 determines whether the count of failures in ACK signal acquisition is less than the set threshold (step S7). If it is less than the threshold (step S7: YES), then the radio device #a 1 retransmits a link confirmation signal (step S8), returning to the ACK signal analyzing process at step S4. If negative (step S7: NO), then the radio device #a 1 performs a communication-mode switching process to switch the communication mode (step S9), returning to the link conformation signal transmitting process at step S2.

Figure 5:
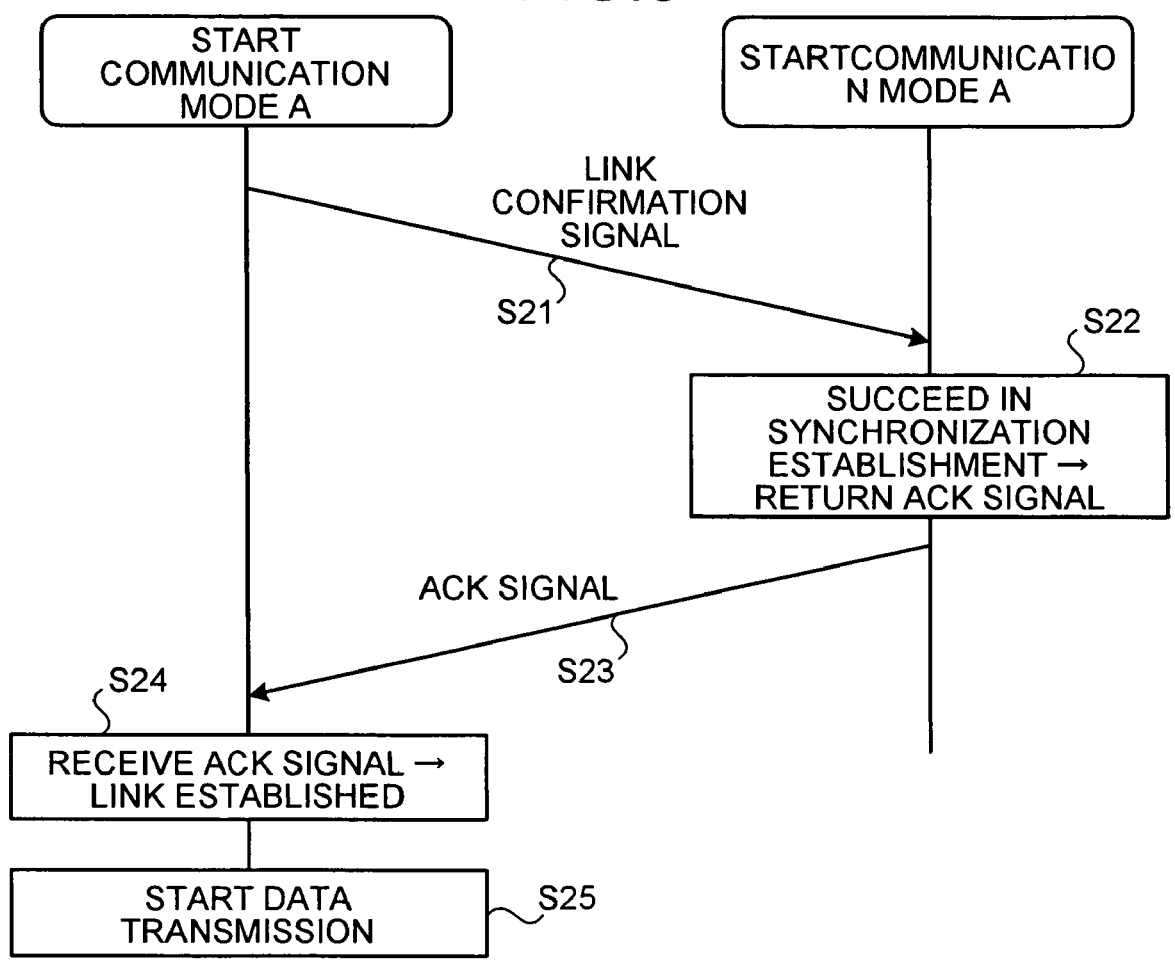
FIG. 5 is a sequence diagram of a link establishing process when communication modes match.

FIG. 5 is a sequence diagram of the link establishing process when communication modes match. As shown in FIG. 5, a transmitter radio device and a receiver radio device are assumed to be capable of radio communication with each other in communication mode A. In this case, the transmitter radio device transmits a link confirmation signal to the communication counterpart radio device in communication mode A (step S21). The receiver radio device receives the link confirmation signal in communication mode A, succeeding in establishing synchronization (step S22). The receiver radio device then returns an ACK signal to the transmitter radio device (step S23). The transmitter radio device receives the ACK signal and determines that it has succeeded in establishing link with the communication counterpart radio device (step S24), to start data communication (step S25).

Figure 6:
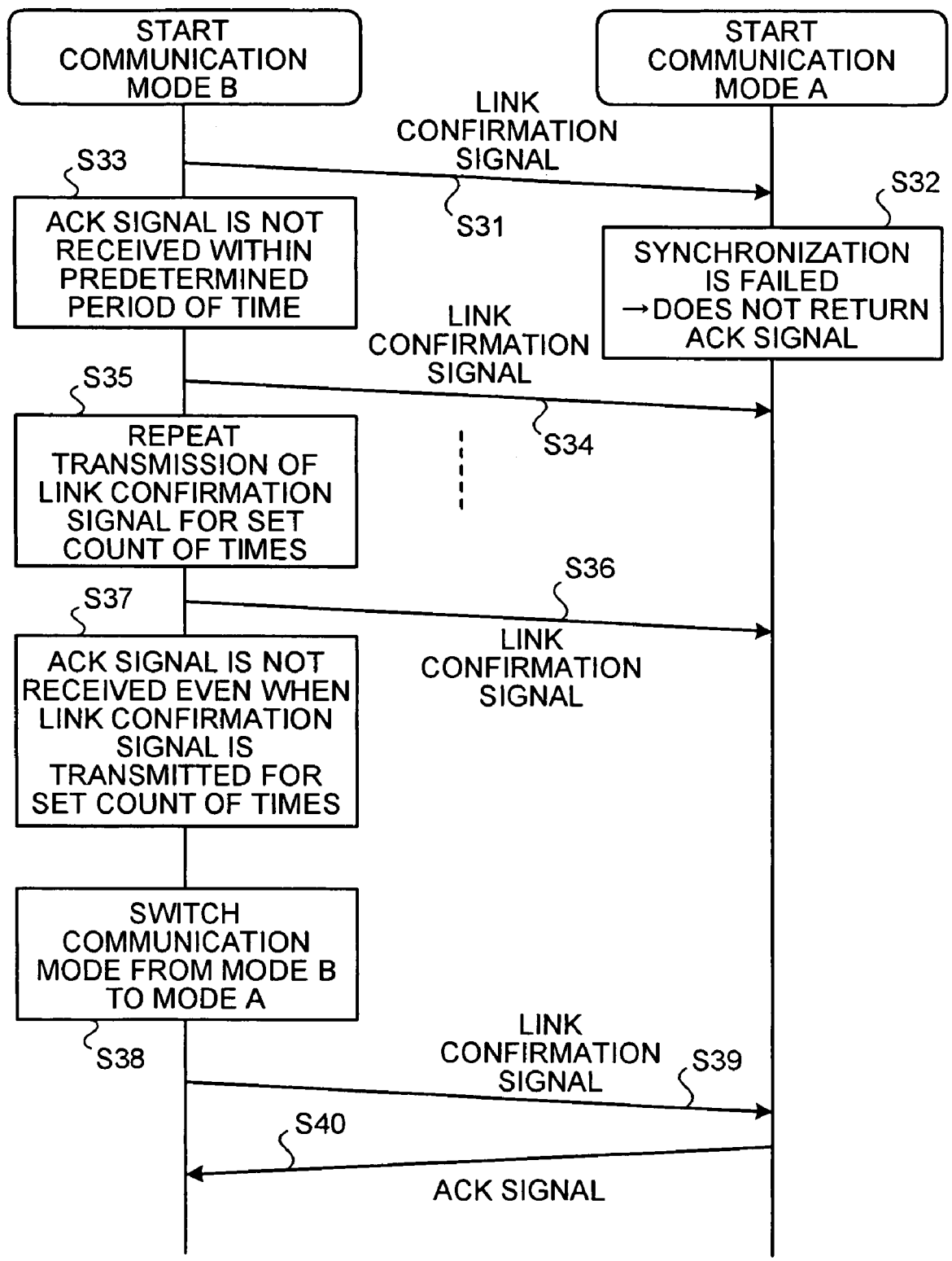
FIG. 6 is a sequence diagram of the link establishing process when the transmitter switches the communication mode.

FIG. 6 is a sequence diagram of the link establishing process when the transmitter switches its communication mode. More specifically, FIG. 6 illustrates a process of establishing link when the transmitter and the receiver do not match in communication mode with the communication mode of the receiver, which is fixed. Assume as shown in FIG. 6 that the transmitter radio device is capable of radio communication in communication mode B and that the receiver radio device is capable of radio communication in communication mode A. In this case, a transmitter radio device transmits a link confirmation signal to a communication counterpart radio device in communication mode B (step S31). The receiver radio device receives the link confirmation signal in communication mode A, failing in synchronization establishment (step S32). Therefore, the receiver radio device does not return an ACK signal.

The transmitter radio device does not receive the ACK signal within a period of time set in advance by the link establishing program (step S33). Therefore, the transmitter radio device retransmits a link confirmation signal to the communication counterpart radio device in communication mode B. This is iterated by the count set in advance by the link establishing program (steps S34, S35, and S36). When the transmitter radio device does not receive an ACK signal from the communication counterpart even when the link confirmation signal is transmitted for the predetermined times (step S37). Therefore, the transmitter radio device switches its communication mode to another mode (step S38). For example, the transmitter radio device switches its communication mode from communication mode B to communication mode A (or it may possibly be switched to communication mode C).

The transmitter radio device then transmits a link confirmation signal to the communication counterpart radio device in communication mode A (step S39). The receiver radio device receives the link confirmation signal in communication mode A and succeeds in establishing synchronization, returning an ACK signal to the transmitter radio device (step S40). Upon reception of the ACK signal, the transmitter radio device recognizes the establishment of link with the communication counterpart radio device, and starts data transmission. If the communication mode switched is different from the receiver radio device's communication mode, the transmitter radio device repeats switching of the communication mode until the transmitter radio device receives an ACK signal from the receiver radio device.

FIG. 7 illustrates examples of the count for the transmitter radio device to estimate the communication mode of the receiver radio device when the receiver communication mode is fixed. Reference numeral 100 denotes a table of communication mode switching patterns of the transmitter radio device, and reference numeral 200 denotes a table indicating that the communication mode of the receiver radio device is fixed. In the example shown in FIG. 7, the communication mode of the receiver radio is fixed to mode A. The transmitter radio device is capable of supporting five different communication modes A, B, C, D, and E, and switches its communication mode starting from communication mode B, for example, if it does not receive an ACK signal even when the link confirmation signal is transmitted in the same communication mode for three consecutive times.

As shown in FIG. 7 with circled characters, the communication mode estimating count required for the communication mode of the transmitter radio device to reach mode A from mode B in the ascending order is 13. On the other hand, the estimating count required to reach mode A from mode B in the descending order is 4. The mean value of the two patterns is 8.5. That is, if the transmitter radio device estimates the communication mode of the receiver radio device for eight to nine times in average, a link is established. The communication modes A, B, C, D, and E are communication modes, such as IEEE802.11a, IEEE802.11b, IEEE802.11g, IEEE802.16, IEEE802.15.3, a wideband code division multiple access (W-CDMA), CDMA2000, a personal digital cellular (PDC), a global system for mobile communications (GSM), and a personal handyphone system (PHS).

A procedure will then be described of the case where the receiver radio device #b 2 estimates the communication mode of the transmitter radio device #a 1, the receiver radio device #b2 being a software defined radio supporting a plurality of communication modes. In this case, the digital baseband unit 22 of the radio device #b 2 is constructed of a reconfigurable circuit in which wiring patterns, etc., can be reconfigured so as to match the communication mode. The MAC processing unit 21 and the external interface unit 23 are configured in the form of the FPGA.

Figure 8:
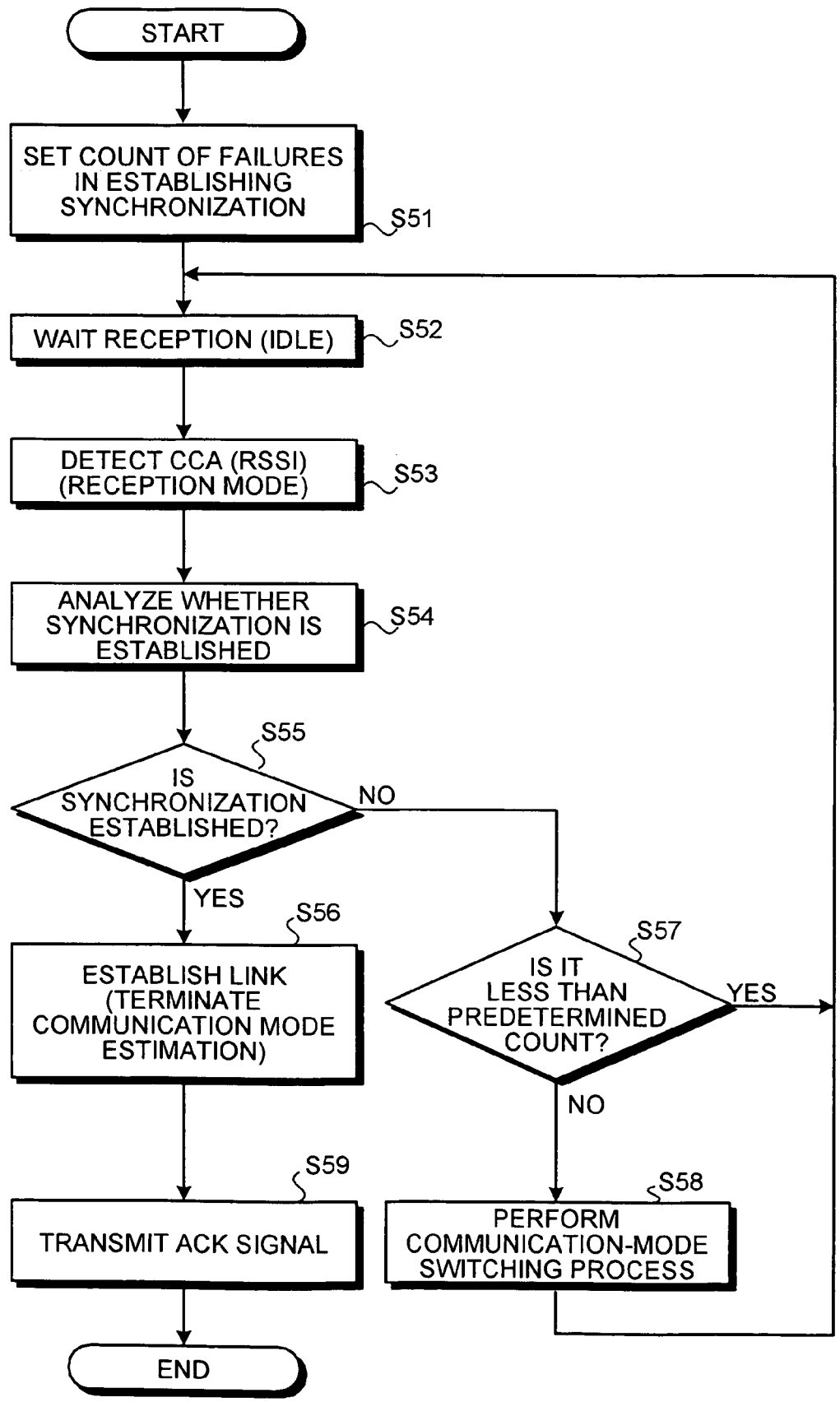
FIG. 8 is a flowchart of the communication-mode estimating process by the receiver radio device.

FIG. 8 is a flowchart of a communication-mode estimating process by the receiver radio device. Specifically, an example is shown of the communication-mode estimating process in the receiver radio device. As shown in FIG. 8, a threshold for switching the communication mode is set in advance. The threshold is the count of failures in synchronization establishment until the communication mode is switched (step S51). The threshold is set by the user operating the PC #d 4 so as to allow the radio device #b 2 to store a communication link establishing program recorded on hard disk of the PC #d 4, a flexible disk connected to the PC #d 4, or a computer-readable recording medium, such as a CD-ROM, an MO, and a DVD, or to store a communication link establishing program downloaded through a network such as the Internet.

The communication link establishing program is stored in memory (not shown in FIGS. 1 and 3) within the CPU 212 of the MAC processing unit 21. Only the synchronization establishment failure count may be set separately from the communication link establishing program. To retain the communication link establishing program or the set threshold even when the power of the radio device #b 2 is turned off, the program or the set threshold may be stored in flash memory.

The CPU 212 executes the communication link establishing program. This allows the radio device #b 2 to wait reception from the communication counterpart in IDLE status (step S52). When the MAC processing unit 21 detects CCA (RSSI), the radio device #b 2 enters reception mode (step S53). The radio device #b 2 then analyzes whether synchronization is established (step S54). As a result, if synchronization is established (step S55: YES), the radio device #b 2 succeeds in link establishment, ending the communication-mode estimating process (step S56), to transmit an ACK signal to the communication counterpart (step S59). Thus, a series of process is terminated.

On the other hand, if synchronization is not established (step S55: NO), the radio device #b 2 determines whether the count of failures in synchronization establishment is less than the threshold (step S57). If it is less than the threshold (step S57: YES), the radio device #b 2 returns to the reception standby status at step S52.

Figure 9:
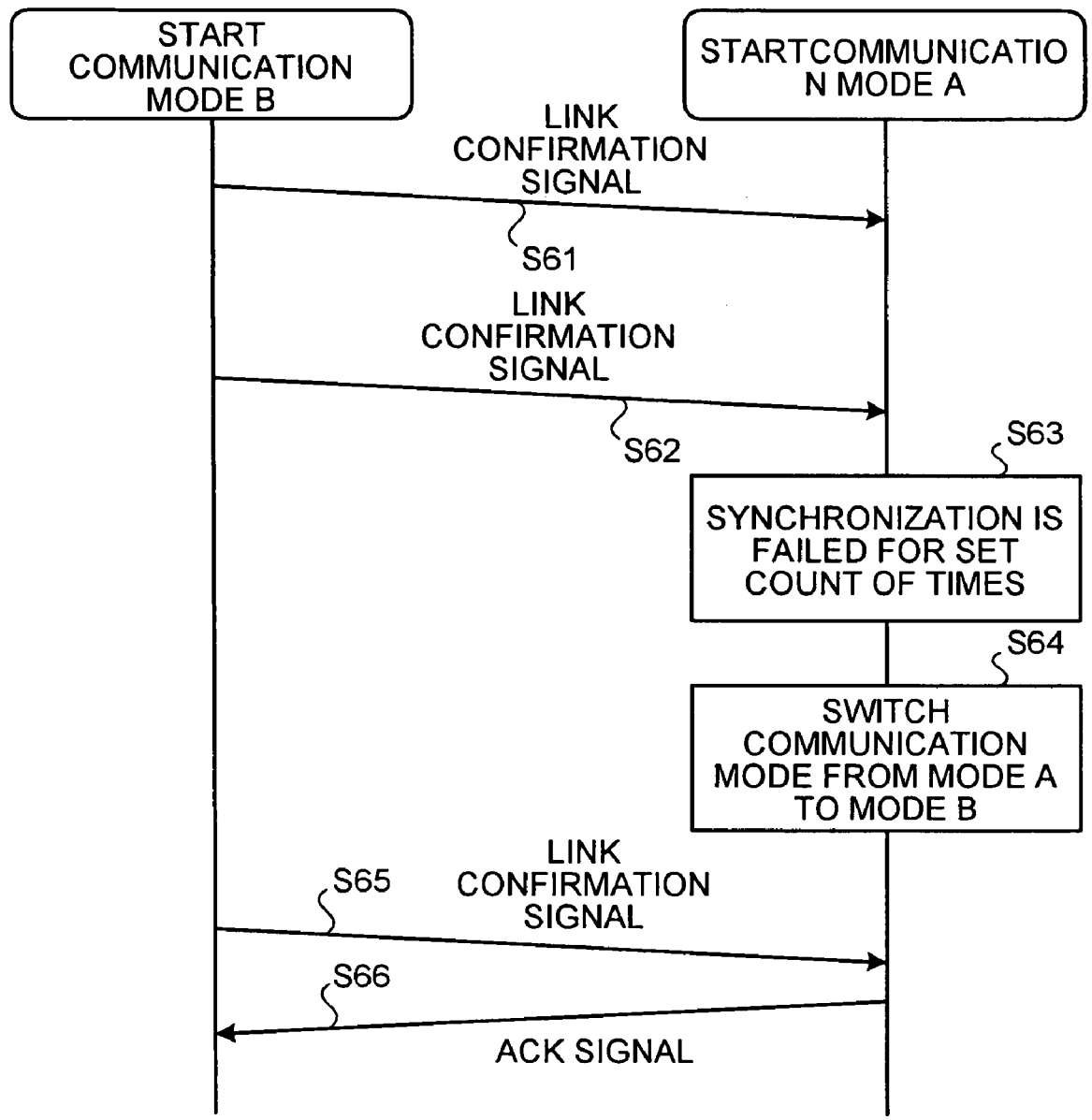
FIG. 9 is a sequence diagram of the link establishing process when the receiver switches the communication mode.

A sequence is shown in FIG. 5 when link is established with the transmitter and the receiver matching in communication mode. FIG. 9 is a sequence diagram of the link establishing process when the receiver switches the communication mode. More specifically, FIG. 9 illustrates a process of establishing link when the transmitter and the receiver do not match in communication mode with the communication mode of the transmitter, which is fixed. Assume as shown in FIG. 9 that the transmitter radio device is capable of radio communication in communication mode B and that the receiver radio device is capable of communication in communication mode A. In this case, a transmitter radio device transmits a link confirmation signal to a communication counterpart radio device in communication mode B (step S61). The receiver radio device receives the link confirmation signal in communication mode A, failing in synchronization establishment. Therefore, the receiver radio device does not return an ACK signal.

The transmitter radio device does not receive the ACK signal and therefore retransmits a link confirmation signal to the communication counterpart radio device in communication mode B. Every time the link confirmation signal is issued, the receiver radio device fails in synchronization establishment. This operation is repeated for the count set in advance by the link establishing program (steps S62). When the receiver radio device fails in synchronization establishment by the predetermined count (step S63), the receiver radio device switches the communication mode to another mode (step S64). For example, the receiver radio device switches the communication mode from communication mode A to communication mode B (or it may possibly be switched to communication mode C).

The receiver radio device then receives in communication mode B the link confirmation signal transmitted in communication mode B from the transmitter radio device (step S65), succeeding in establishing synchronization, to return an ACK signal to the transmitter radio device (step S66). Upon reception of the ACK signal, the transmitter radio device recognizes the establishment of link with the communication counterpart radio device, starting data transmission. In case its communication mode switched is different from the transmitter radio device's communication mode, the receiver radio device continues to switch its communication mode until it receives a link confirmation signal to establish synchronization. Description will then be made of the case where the transmitter radio device #a 1 and the receiver radio device #b 2 estimate their respective counterpart radio device's communication modes with both the transmitter radio device #a 1 and the receiver radio device #b 2 being software defined radios capable of supporting a plurality of communication modes. The configurations of the radio device #a 1 and the radio device #b 2 are the same as those of the above case where the radio device #a1 and the radio device #b 2 are software defined radios. The flowcharts are as shown in FIGS. 4 and 8, respectively, of the communication-mode estimating process by the transmitter radio device and of the communication-mode estimating process by the receiver radio device.

Figure 10:
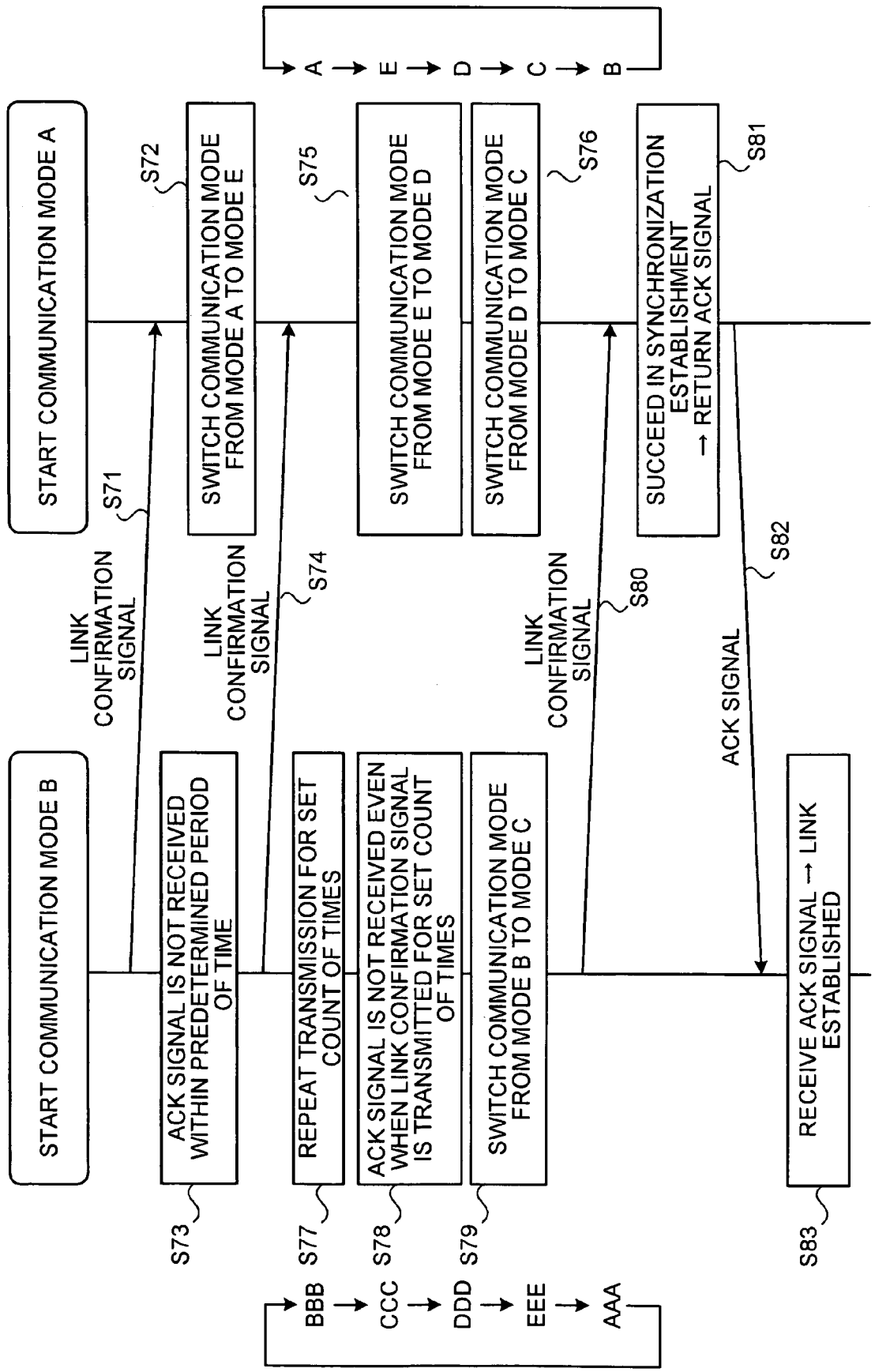
FIG. 10 is a sequence diagram of a link establishing process when both the transmitter and the receiver switch the respective communication modes.

A sequence is as shown in FIG. 5 when link is established with the transmitter and the receiver matching in communication mode. FIG. 10 is a sequence diagram of the link establishing process when both the transmitter and the receiver switch their respective communication modes. Specifically, a process is shown of establishing link from the status where the transmitter and the receiver do not match in communication mode with both the transmitter and the receiver being variable in communication mode. It is assumed as shown in FIG. 10 that the transmitter radio device is capable of radio communication in communication mode B and that the receiver radio device is capable of radio communication in communication mode A.

The transmitter radio device and the receiver radio device are both assumed to be supporting five different communication modes A, B, C, D, and E. The transmitter radio device is assumed to switch the communication mode in ascending order when the transmitter radio device does not receive an ACK signal even when the link confirmation signal is transmitted for three consecutive times in the same communication mode. On the other hand, the receiver radio device is assumed to switch the communication mode in descending order every time the synchronization is failed to be established.

The transmitter radio device transmits a link confirmation signal to the communication counterpart radio device in communication mode B (step S71). The receiver radio device receives the link confirmation signal in communication mode A, failing in synchronization establishment. Therefore, the receiver radio device does not return an ACK signal but switches its communication mode to mode E (step S72). On the other hand, the transmitter radio device does not receive an ACK signal within a preset period of time (step S73), and hence retransmits a link confirmation signal to the communication counterpart radio device in communication mode B (step S74). As long as the transmitter and the receiver are different from each other in communication mode, the receiver radio device fails in synchronization establishment and switches its communication mode to mode D, mode E, etc., every time it fails (steps S75 and S76). The transmitter radio device retransmits a link confirmation signal in communication mode B by the predetermined count (step S77). If the transmitter radio device does not receive an ACK signal in response to retransmission of the link confirmation signal (step S78), then the transmitter radio device switches its communication mode to mode C (step S79).

When at this stage the transmitter radio device transmits a link confirmation signal to the communication counterpart radio device in communication mode C (step S80), the receiver radio device receives the link confirmation signal in communication mode C, succeeding in establishing synchronization (step S81). Therefore, the receiver radio device returns an ACK signal to the transmitter radio device (step S82). The transmitter radio device receives the ACK signal (step S83) and recognizes establishment of link with the communication counterpart radio device, starting data transmission.

Figure 11:
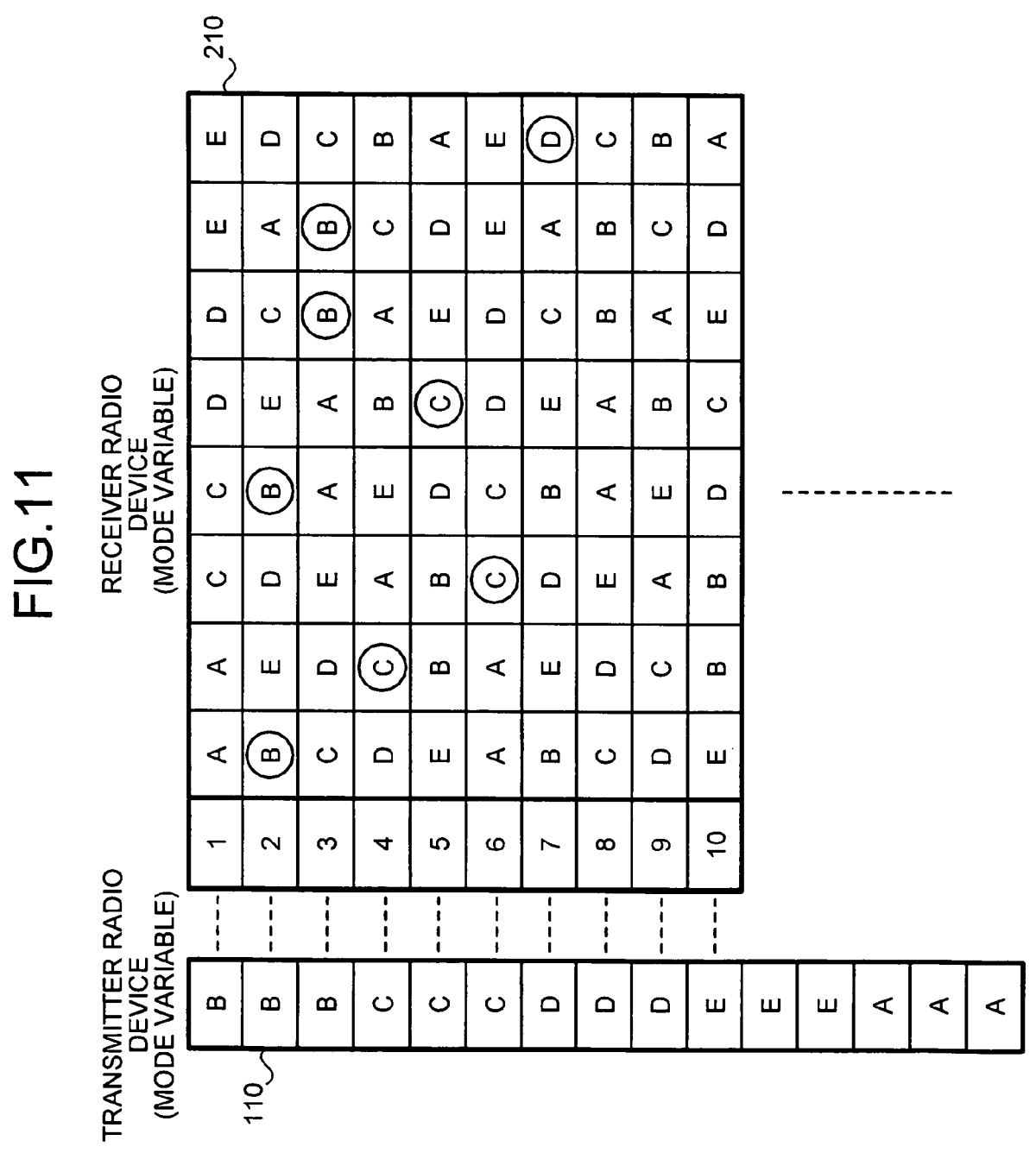

FIG. 11 illustrates an example of the count for both the transmitter radio device and the receiver radio device to estimate their respective communication modes when the transmitter communication mode and the receiver communication mode are both variable. In FIG. 11, reference numeral 110 denotes a table of communication mode switching patterns of the transmitter radio device, and reference numeral 210 denotes a table of communication mode switching patterns of the receiver radio device.

In the example of FIG. 11, the transmitter radio device supports five different communication modes A, B, C, D, and E, and switches its communication mode in ascending order starting from communication mode B, for example, if it does not receive an ACK signal even when of the link confirmation signal is transmitted for three consecutive times. The receiver radio device supports five different communication modes A, B, C, D, and E, and switches its communication mode every time it fails in synchronization establishment. The table 210 of the receiver switching patterns shows patterns to switch the communication mode from modes A, C, D and E in ascending order and descending order, respectively.

As shown in FIG. 11 with circled characters, the communication mode estimating count required for the receiver radio device starting from mode A is only two when the switching pattern is in ascending order, and four when it is in descending order. The communication mode estimating count required for the receiver radio device starting from mode C is six and two when the switching pattern is in ascending order and descending order, respectively. The communication mode estimating count required for the receiver radio device starting from mode D is five and three when the switching pattern is in ascending order and descending order, respectively. The communication mode estimating count required for the receiver radio device starting from mode E is three and seven when the switching pattern is in ascending order and descending order, respectively. The mean value thereof is four and link can be established by performing the communication mode estimation of the order of four times in average.

As explained above, according to the embodiments of the present invention, if the transmitter radio device receives an ACK signal from the communication counterpart in response to a link confirmation signal, the transmitter radio device determines that the communication modes match and a link is established, whereas if the transmitter radio device does not receive the ACK signal, the transmitter radio device determines that the communication modes differ, and switches the communication mode, thereby establishing a link with the communication counterpart without a redundant radio processing circuit for communication link establishment. Moreover, the receiver radio device tries to establish synchronization based on a link confirmation signal transmitted from the communication counterpart, and if the synchronization is established, the receiver ration device returns an ACK signal to the communication counterpart since the communication modes match and a link can be established, whereas if no synchronization is established, the receiver radio device switches its communication mode, thereby establishing a link with the communication counterpart without a redundant radio processing circuit for communication link establishment.

Figure 12:
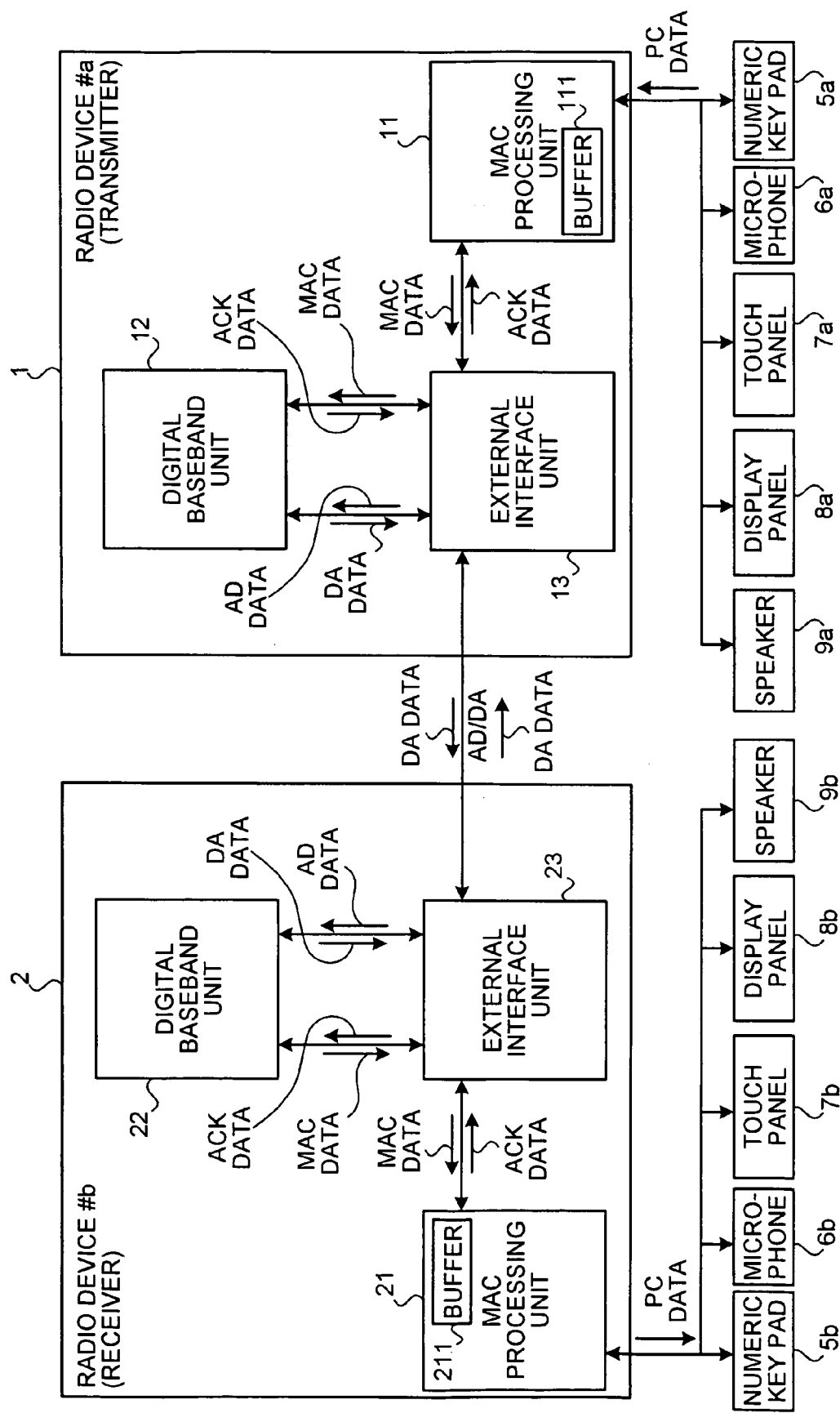
FIG. 12 is a schematic for illustrating a configuration of a mobile phone including the radio device and data flows in the radio devices.

It is to be noted that the communication mode switching patterns of the transmitter radio device and the receiver radio device are not limited to the above examples. The above radio device #a 1 and radio device #b 2 may be built in a cellular phone for implementing radio communication functions of the cellular phone. In this case, as shown in FIG. 12, the MAC processing units 11 and 21 are connected to, instead of the personal computer, a man-machine interface, such as numeric key pads 5a and 5b, microphones 6a and 6b, touch panels 7a and 7b, display panels 8a and 8b, and speakers 9a and 9b.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of establishing a communication link in a radio device supporting a plurality of communication modes, the method comprising:
   transmitting a confirmation signal to a communication counterpart with which the communication link is to be established; and
   switching a communication mode to another communication mode if an acknowledgment signal is not returned from the communication counterpart in response to the confirmation signal;
   wherein the transmitting includes transmitting the confirmation signal for a plurality of times without switching the communication mode when the acknowledgement signal is not returned, and
   the switching includes switching the communication mode when a count of transmission at the transmitting the confirmation signal without switching the communication mode exceeds a threshold.

2. The method according to claim 1, further comprising starting transmission of data to the communication counterpart upon receiving the acknowledgement signal.

3. A method of establishing a communication link in a radio device supporting a plurality of communication modes, the method comprising:

detecting a reception signal at a predetermined level during reception standby;

trying to establish synchronization based on the reception signal; and switching a communication mode to another communication mode if the synchronization is failed to be established at the trying;

wherein the trying includes trying to establish the synchronization for a plurality of times without switching the communication mode, and the switching includes switching the communication mode when a count of trial to establish the synchronization without switching the communication mode exceeds a threshold.

4. The method according to claim 3, further comprising transmitting an acknowledgment signal to the communication counterpart when the synchronization is succeeded to be established at the trying.

5. A computer-readable recording medium that stores therein a computer program for establishing a communication link in a radio device supporting a plurality of communication modes, the computer program making a computer execute:

transmitting a confirmation signal to a communication counterpart with which the communication link is to be established; and switching a communication mode to another communication mode if an acknowledgment signal is not returned from the communication counterpart in response to the confirmation signal;

wherein the transmitting includes transmitting the confirmation signal for a plurality of times without switching the communication mode when the acknowledgement signal is not returned, and the switching includes switching the communication mode when a count of transmission at the transmitting the confirmation signal without switching the communication mode exceeds a threshold.

6. A computer-readable recording medium that stores therein a computer program for establishing a communication link in a radio device supporting a plurality of communication modes, the computer program making a computer execute:

detecting a reception signal having a predetermined level during reception standby;

trying to establish synchronization based on the reception signal; and switching a communication mode to another communication mode if the synchronization is failed to be established at the trying;

wherein the trying includes trying to establish the synchronization for a plurality of times without switching the communication mode, and the switching includes switching the communication mode when a count of trial to establish the synchronization without switching the communication mode exceeds a threshold.

* * * * *

UNITED STATES PATENT AND TRADEMARK OFFICE
CERTIFICATE OF CORRECTION

PATENT NO. : 7,664,526 B2 Page 1 of 1
APPLICATION NO. : 11/443150
DATED : February 16, 2010
INVENTOR(S) : Sakai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Twenty-eighth Day of December, 2010

David J. Kappos
*Director of the United States Patent and Trademark Office*